UNITED STATES PATENT OFFICE.

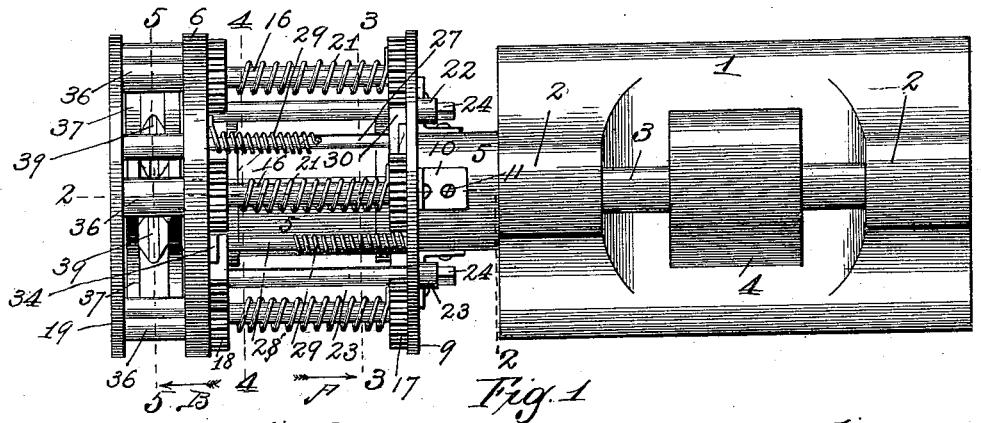

JOHN B. DODSON, OF ST. LOUIS, MISSOURI.

BOTTLE-CAPPING MACHINE.

SPECIFICATION forming part of Letters Patent No. 557,561, dated April 7, 1896.

Application filed September 23, 1895. Serial No. 563,324. (No model.)

*To all whom it may concern:*

Be it known that I, JOHN B. DODSON, of the city of St. Louis, State of Missouri, have invented certain new and useful Improvements in Bottle-Capping Machines, of which the following is a full, clear, and exact description, reference being had to the accompanying drawings, forming a part hereof.

My invention relates to an improved bottle-capping machine; and it consists in the novel construction, combination, and arrangement of parts hereinafter described and claimed.

In the drawings, Figure 1 is a top plan view of my improved bottle-capping machine. Fig. 2 is a vertical sectional view taken on the line 2 2 of Fig. 1. Fig. 3 is a cross-sectional view taken on the line 3 3 of Fig. 1. Fig. 4 is a cross-sectional view taken on the line 4 4 of Fig. 1. Fig. 5 is a cross-sectional view taken on the line 5 5 of Fig. 1. Fig. 6 is a side elevation of a horizontally-moving head made use of in carrying out my invention. Fig. 7 is a side elevation of one of the rollers and the arms carrying the same, as is contemplated by my invention.

Referring by numerals to the accompanying drawings, 1 indicates a suitable base, with which is formed integral journal-bearings 2. In said bearings 2 is journaled a shaft 3, on which is rigidly fixed a belt wheel or pulley 4.

5 indicates a tube, with the outer end of which is formed integral a disk 6. The rear end of the tube 5 is screw-threaded, as indicated by 7, in order that the same may be fixed upon the protruding screw-threaded end of the shaft 3. Formed integral with the exterior of the tube 5, at a point intermediate its ends, is a flange 8.

9 indicates a disk of the same size as is the disk 6, and said disk 9 is arranged upon the tube 5 at a point a slight distance to the rear of the flange 8. By the use of brackets 10, through which pass screws 11, this disk 9 is securely held to the tube 5.

12 indicates a cylindrical casing, the ends of which are fitted around the peripheries of the disks 6 and 9. Removably fixed on the tube 5, a slight distance to the rear of the disk 6, is a ring 13, and loosely arranged upon said tube 5, between said ring 13 and the disk 6, is a gear-wheel 14. A gear-wheel 15, identical in form and size with the gear-wheel 14, is interposed between the flange 8 and the disk 9, and said gear-wheel is loosely arranged upon the tube 5.

Journaled in the disk 6, at points at equal distances from one another, are a series of shafts 16, the rear ends of which are journaled in the disks 9, the forward ends of said shafts projecting a slight distance beyond the disk 6. Loosely mounted on these shafts 16, adjacent the disk 9, are pinions 17, the same being in gear with the gear-wheel 15. Rigidly fixed upon the shafts 16, by being shrunk thereon or in any other common manner, adjacent the disk 6, are pinions 18, the same meshing with the gear-wheel 14. Fixed in any common way upon the protruding forward ends of the shafts 16 is a disk 19, the same being provided with a centrally-arranged aperture 20. Torsionally-bent coil-springs 21 are located upon the shafts 16, between the pinions 17 and 18 thereon, and said springs have their forward ends fixed to said shafts by means of common pins, around which their said ends are bent, while their rear ends are fixed to the pinions 17 by being brazed or soldered thereto. (See Fig. 2.)

Journaled in the disks 6 and 9 are a pair of shafts 22 and 23, the rear ends of said shafts protruding through the disk 9 and having their ends squared, as indicated by 24. Fixed by shrinkage upon the shaft 22, adjacent the disk 9, is a pinion 25, and fixed in the same way upon the shaft 23, adjacent the disk 6, is a pinion 26.

27 and 28 indicate shafts which are journaled in the disk 6 and 9 and at points adjacent and above the shafts 22 and 23. Located upon said shafts 27 and 28 are torsional coil-springs 29, the outer end of the coil-spring that is located upon the shaft 27 being fixed at one end to said shaft and by its opposite end to the disk 6. One end of the coil-spring that is located upon the shaft 23 is fixed to the disk 9, while the opposite end is fixed to said shaft. These springs are fixed by the same means which are used in fixing the springs 21, already described.

30 indicates a pawl located upon the shaft 27, the point of which pawl engages between the teeth of the pinion 25, and a finger 31 is formed integral with said pawl, the same extending upwardly through a slot 32, formed in the cylindrical casing 12. A pawl 33, identical in form and size with the pawl 30, is located upon the shaft 28, and said pawl 33 is constructed with an integral finger 34, that extends upwardly through a slot 35, formed in the casing 12. Said pawl 33 is held normally out of engagement with the teeth of the pinion 26.

Fixed upon the ends of the shafts 16, between the disks 6 and 19, are sleeves 36, with each one of which is formed integral a pair of parallel arms 37, in the outer ends of which are journaled transverse pins 38, and upon said pins 38 are mounted for rotation disks 39. Mounted to slide in the forward end of the tube 5 is a disk 40, with which is formed integral a centrally-arranged rearward projection 41, and passing through said disk and projection is an aperture 42. Formed integral with the rear face of this disk 40 and arranged opposite one another are arms 43, provided with slots 44. Passing through the wall of the tube 5 and on opposite sides thereof are pins or screws 45, the same engaging through the slots 44 in the arms 43. Guiding-arms 46 are formed integral with the rear face of the disk 40 at right angles to the arms 43, and said arms 46 are arranged to bear against the inner face of the tube 5.

47 indicates a circular cup, to which is fixed a pin 48, which is arranged to slide through the aperture 42, formed through the disk 40 and projection 41. A body of cork or analogous material 49 is located in the cup 47, the face of said body of cork lying nearly flush with the edges of said cup. Located within the tube 5, between the rear ends of the arms 43 and the rear end of said tube 5, is an expansive coil-spring 50.

The operation is as follows: When the shaft 3 is rotated, the tube 5 and parts carried thereby will necessarily be rotated with said shaft. The normal tendency of the coil-spring 50 is to hold the disk 40 carrying the cup 47 at its outward limit of movement, and when in this position the disks 39 ride directly upon the outer edge of the cup 47. To locate a cap upon a bottle with my improved device, the bottle after being properly corked has the foil cap slipped over the cork and neck. This being done the upper end of said bottle is passed through the aperture in the disk 19, as indicated by dotted lines in Fig. 2, until the top of the cap, or that portion that covers the cork, engages directly against the body of cork 49 located in the cup 47. By locating a yielding body within the cup 47 the printing or embossing on top of the cap remains intact and is not injured in any manner while the bottle is being engaged by the capping-machine. When the bottle carrying the unsecured cap is brought into contact with the body of cork 49, the cup 47 will cease to rotate, as the shaft 48 is loosely arranged in the aperture 42. The bottle is now moved rearwardly, and in so doing the disk 40 carrying the slotted and guiding arms is moved rearwardly and the coil-spring 50 is compressed. As said bottle moves rearwardly, the disks 39 will ride over the cup 47 onto that portion of the cap that is located upon the head and neck of the bottle, and as said disks 39 are rotating at a high rate of speed said cap will be very evenly and efficiently fixed upon the head and neck of the bottle. The normal tendency of the coil-springs 21 is to so rotate the shafts 16 as that the disks 39, carried by the arms 37, located upon said shafts will be moved toward the center. Consequently as said disks 39 are bearing upon the cap upon the head and neck of the bottle they will readily yield to and follow the curvature of said head and neck and all parts of the foil cap will be very smoothly engaged upon the surface of the bottle. When the bottle has been passed a sufficient distance into the capping-machine, the pressure thereon is relieved and the power stored in the coil-spring 50 will cause the disk 40, parts carried thereby, and the cup 47 to move outwardly to their normal positions. By so doing the disks 39 will pass over the cap a second time, and thus very effectually set the cap upon the head and neck of the bottle.

To adjust the positions of the rollers for different-sized bottles, the operation is as follows: A key, wrench, or like tool is located upon the squared end 24 of the shaft 23 and the same is rotated a slight distance in the proper direction. By so doing the gear-wheel 14, located upon the forward end of the tube 5, is partially rotated, and the pinions 18 rigidly fixed upon the shafts 16 being in mesh with said gear-wheel 14 will be simultaneously rotated. The disks 39, carried by the parallel arms 37 that are in turn carried by the shafts 16, will be moved to equal distances from the center of the device. The normal tendency of the coil-spring 29 on the shaft 28 is to hold the pawl 33 out of engagement from between the teeth of the pinion 26. Should it be desired to hold the disks or rollers 39 apart, or, as indicated by dotted lines in Fig. 5, for the purpose of removing the cup 47 containing the cork when the pinions 26 on the shafts 16 have been rotated to the proper points, the point of the pawl 33 is thrown into engagement between two of the teeth of the pinion 26, and the power stored in the coil-springs 21 being much greater than the power of the spring 29 will hold said pawl in engagement. Consequently the disks or rollers 39 will be held apart, as desired.

To adjust the tension of the coil-springs 21 located upon the shafts 16 the operation is as follows: The operator first moves the finger 31 so that the point of the pawl 30 is disengaged from between the teeth of the disk 25. A key or like tool is now located upon the squared end 24 of the shaft 22 and said shaft is rotated thereby. With this rotary motion of the shaft 22 the pinion 25 located thereon will be rotated, and in turn the gear-wheel 15 that is in mesh with said pinion 25, and the pinions 17 in mesh with the gear-wheel 15, will be rotated. As the ends of the coil-springs 21 are fixed to these pinions 17, said coil-springs can be tightened or loosened, as desired, to give the proper tension to the shaft 16. When said tension is obtained, the point of the pawl 30 is allowed to reëngage between two of the teeth of the pinion 25.

A bottle-capping machine of my improved construction is simple, strong, and durable, easily operated, very smoothly and effectually locates the caps upon bottles, does not allow the embossing or lettering on the tops of the caps to be defaced in any manner, and said machine may be very easily adjusted for different-sized bottles.

The disks or rollers 39 are preferably constructed of hard rubber.

An important feature gained by the use of a bottle-capping machine of my improved construction is that the lacquer or varnish on the caps is not broken or abraded while the rollers are pressing the cap onto the head and neck of the bottle.

I claim—

1. In a bottle-capping machine, a shaft mounted for rotation in suitable bearings, a tube carried by one end of said shaft, disks fixed upon said tube, a tubular casing arranged upon said disks, a spring-actuated disk arranged to move longitudinally in said tube, a body of yielding material removably located upon said disk, a series of shafts journaled in the disks, pairs of arms carried by each one of said shafts, disk-rollers journaled between the outer ends of each pair of arms, the same being arranged to rotate upon and revolve around the head and neck of a bottle.

2. In a bottle-capping machine, a shaft mounted for rotation in suitable bearings, a tube carried by the outer end of said shaft, disks arranged upon said tube, shafts journaled in said disks, springs arranged upon said shafts, pairs of arms carried by each of said shafts, disk-rollers journaled between the outer ends of said pairs of arms, means for adjusting the positions of the shafts, and means for adjusting the tension of the springs located upon said shafts.

In testimony whereof I affix my signature in presence of two witnesses.

JOHN B. DODSON.

Witnesses:
EDWARD EVERETT LONGAN,
MAUD GRIFFIN.